Figure 1:
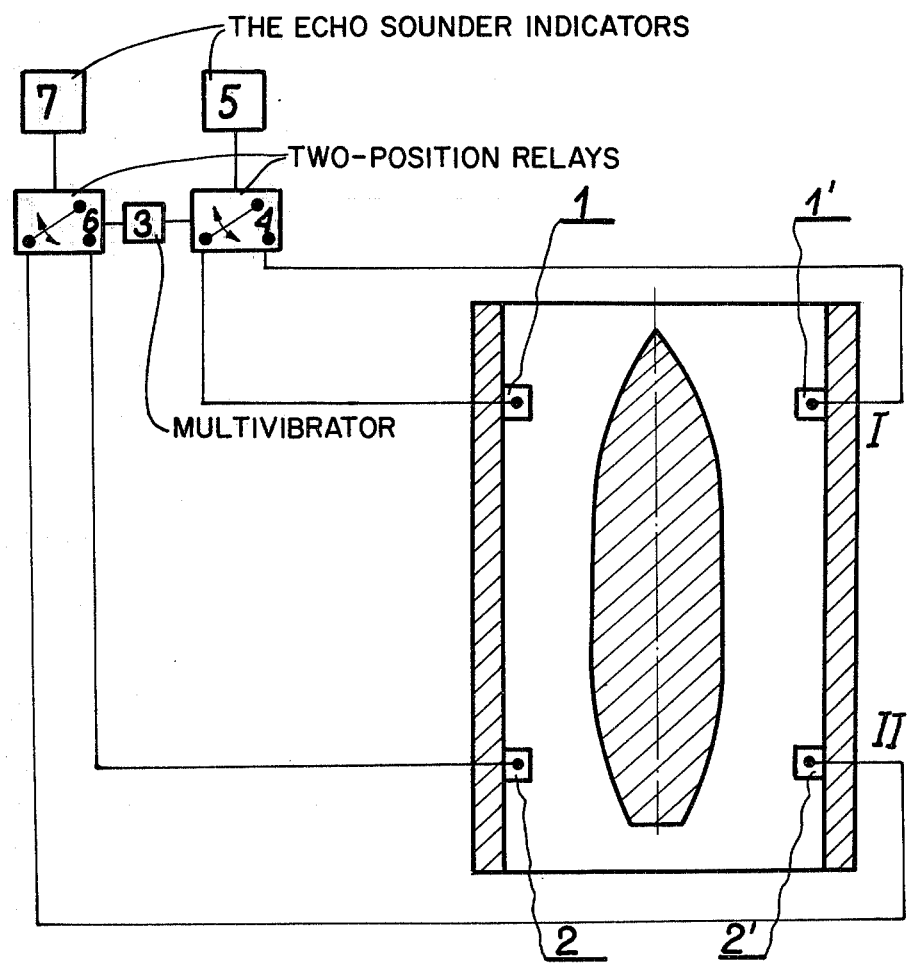

United States Patent [19]

Markowski et al.

[11] 4,254,484
[45] Mar. 3, 1981

[54] DEVICE FOR THE DETERMINATION OF A SHIP IN DOCK AT THE TIME OF DOCKING

[75] Inventors: Kazimierz Markowski, Gdansk; Jacek Truszkowski, Sopot; Wojciech Niedzielski, Gdansk-Oliwa; Jaroslaw Slomkowski, Gdynia, all of Poland

[73] Assignee: Przedsiebiorstwo Wdrazania I Upowszechniania Postepu Technicznego I Organizacyjnego Posteor Oddziat W Gdansku, Sopot, Poland

[21] Appl. No.: 44,011

[22] Filed: May 31, 1979

[30] Foreign Application Priority Data

Jun. 6, 1978 [PL] Poland ................................ 207386

[51] Int. Cl.³ ............................................. G01S 15/10
[52] U.S. Cl. .................................. 367/115; 343/5 BD
[58] Field of Search .............. 343/5 BD; 367/99, 107, 367/113, 115

[56] References Cited

U.S. PATENT DOCUMENTS 3,754,247  8/1973  Hansford .......................... 343/5 BD

FOREIGN PATENT DOCUMENTS 1384647  2/1975  United Kingdom ................. 343/5 BD Primary Examiner—Richard A. Farley
Attorney, Agent, or Firm—Haseltine and Lake

[57] ABSTRACT

The present invention relates to a device for determination of position of a ship in the dock at docking, based on the principle of reflection of ultrasonic waves from solid bodies in water.

The device includes two pairs of transmitting-receiving converters (1), (1') and (2), (2') of an echo sounder, each of which is connected to a separate indicator (5) and (7) of the echo sounder through a bi-stable switch (4), (6), while the both two-position relay elements (4) and (6) are connected to only one multivibrator (3).

1 Claim, 3 Drawing Figures

DEVICE FOR THE DETERMINATION OF A SHIP IN DOCK AT THE TIME OF DOCKING

BACKGROUND OF INVENTION

The present invention relates to a device for determination of the position of a ship in dock at the time of docking, based on the principle of reflection of ultrasonic waves from solid bodies in water.

Those skilled in the art know of a device consisting of transmitting-receiving converters of an echo sounder arranged in pairs along the dock, wherein the transmitting-receiving converters of each pair are disposed opposite to each other symmetrically relative to the plane of symmetry of the dock. Each transmitting-receiving converter of the echo sounder is connected to a separate indicator of the echo sounder.

SUMMARY OF INVENTION

The device according to the invention has at least one pair of transmitting-receiving converters of an echo sounder located opposite to each other, symmetrically relative to the longitudinal plane of symmetry of the dock. Both transmitting-receiving converters of the echo sounder are connected to a two-position switch, preferably a two-position relay controlled by a multivibrator. The two-position switch is connected to the echo sounder indicator. A preferable version of the device includes two pairs of transmitting-receiving converters, wherein each pair is connected to a separate echo sounder indicator through a two-position relay, while the two-position relays are connected to one multivibrator.

The inventive device has the following advantages. It enables the correct position of a ship in a dock to be displayed on an echograph without the necessity of reading the distance of the ship's sides from the dock wing structures. Moreover, the device renders it possible to measure the deflection of the plane of symmetry of a ship from the plane of symmetry of dock on one echograph. If the plane of symmetry of the ship corresponds to the longitudinal plane of symmetry of dock, the records of an echograph lie on a straight line.

The device of the present invention will now be described by means of example and with reference to the accompanying drawing in which:

IN THE DRAWINGS

Figure 2:
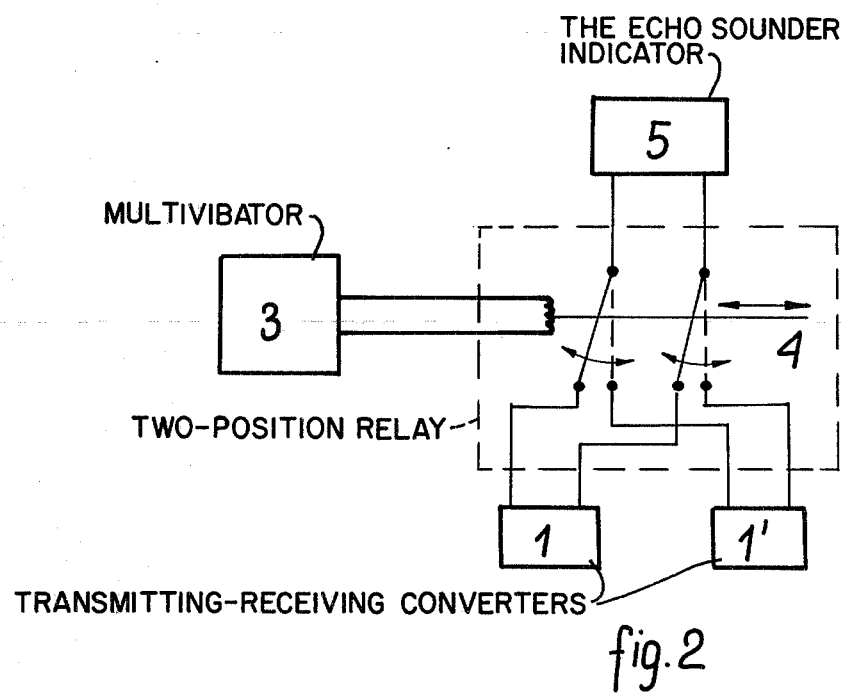
Figure 3:
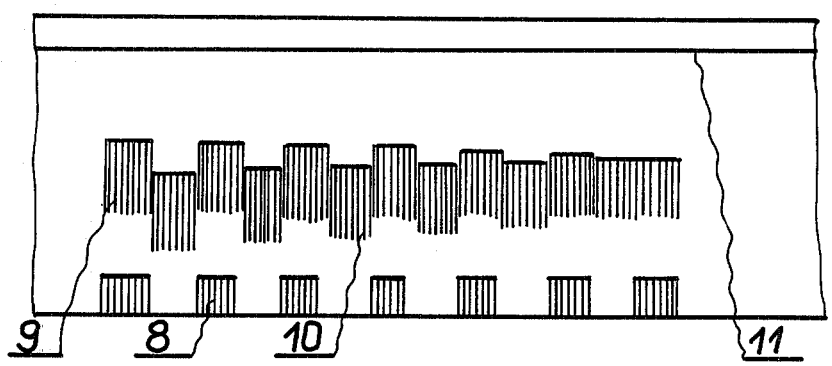

FIG. 1 presents the plan of a dock with an introduced ship and a lay-out of the connections of the device, FIG. 2 presents wiring diagram of a two-position relay;

FIG. 3 presents an echograph obtained at docking.

DESCRIPTION OF INVENTION

The device includes two pairs of transmitting-receiving converters 1, 1', 2, 2' of an echo sounder; a multivibrator 3 which controls the two-position relay 4, included between the pair of transmitting-receiving converters 1, 1' of the echo sounder and indicator 5 of echo sounder simultaneously controls two-position relay 6; included between the second pair of transmitting-receiving converters 2, 2' of the echo sounder and indicator 7 of echo sounder. Two-position relay 4 is connected to the control vibrator 3, which switches over in a cyclic manner the input of indicator 5 of echo sounder to the output of transmitting-receiving converters 1, 1' of the echo sounder. On an echograph there is a side mark 8, corresponding to the record 9 of the distance of the left-hand side of the ship from the transmitting-receiving converter 1 of the echo sounder. Record 10 without a mark 8, presents the distance of the right-hand side of the ship from the transmitting-receiving converter 1 of the echo sounder. The position of the records on echograph relative to the record of transmitting pulse 11 of echographs, renders it possible to obtain an accurate position of a ship in the dock, the deflection of the ship from the plane of symmetry of the dock does not exceed 5 cm.

Upon introducing the ship into the dock, its position relative to the plane of symmetry of dock is determined. Determination of the position of a ship in the described example, is performed simultaneously along two measuring lines I and II. At the moment of switching in the supply of the device, indicators 5 and 7 of the echo sounder are temporarily connected e.g. to the transmitting-receiving converters 1 and 2 of the echo sounder, located on the left-hand side of the ship. In such a case indicators 5 and 7 of the echo sounder record the distances of the left-hand side of the ship from the transmitting-receiving converters 1 and 2 of the echo sounder as measured along the measuring lines I and II. This state lasts several seconds, until multivibrator 3 sends a pulse switching over the contacts in two-position relays 4 and 6 to the transmitting-receiving converters 1', 2' of echo sounder located on the right-hand side of the ship. Within the next few seconds, the echograph will record the distance of the right-hand side of the ship. Switching over is effected in a cyclic way and consequently the echograph presents the record of distances of the both ship's sides with a simultaneous presentation of the difference of distances as measured along the measuring lines I and II separately.

A switching frequency of two-position relays 4 and 6 has been so chosen that 10 to 50 records are obtained on an echograph between the successive switching pulses.

We claim:

1. Device of determination of a ship in the dock at time of docking, including at least one pair of transmitting-receiving converters of an echo sounder arranged opposite to each other, symmetrically to the longitudinal plane of symmetry of the dock, and an echo sounder indicator, the improvement comprising that each pair of transmitting-receiving converters (1), (1') or (2), (2') of the echo sounder is connected to only one indicator (5), (7) of the echo sounder through a bi-stable switch, preferably a two-position relay (4), (6) controlled by a multivibrator (3), whereas the device preferably includes two pairs of transmitting-receiving converters (1), (1') and (2), (2') of the echo sounder, each of these pairs of converters being connected to a separate indicator (5) and (7) of an echo sounder through the two-position relay (4), (6), both of said two-position relay elements (4) and (6) being connected to only one multivibrator (3).

* * * * *